Oct. 2, 1923.
M. W. RYAN ET AL
1,469,444
RADIATOR METER
Filed Nov. 19, 1921
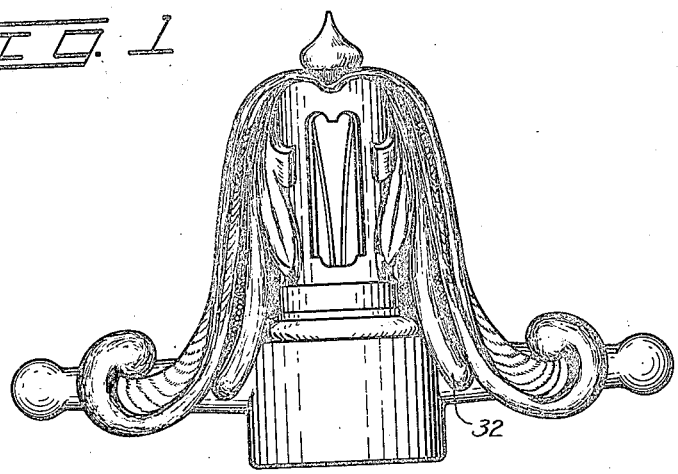
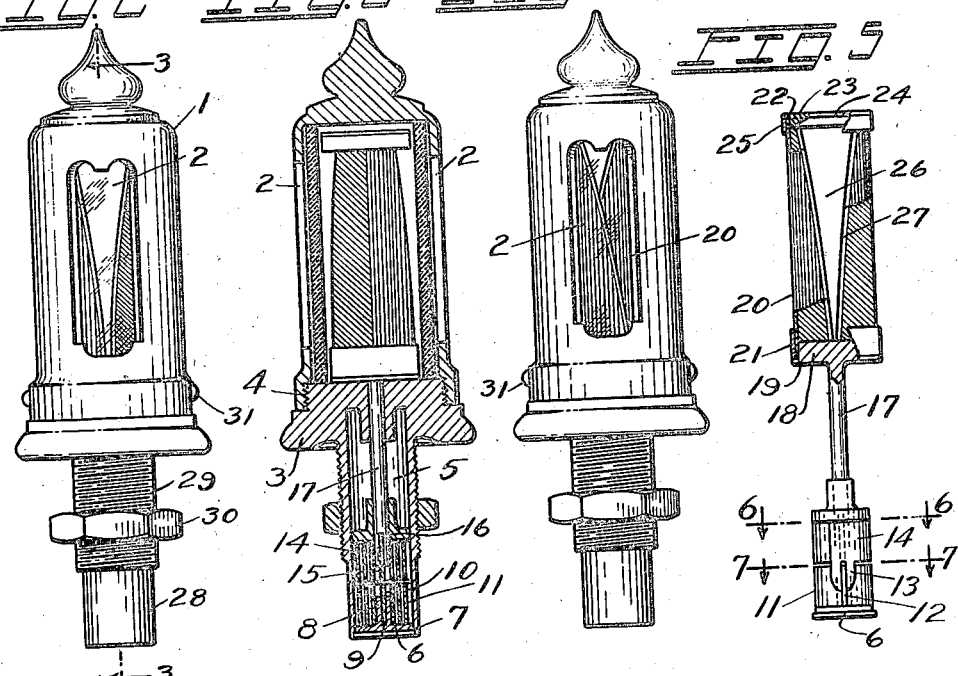
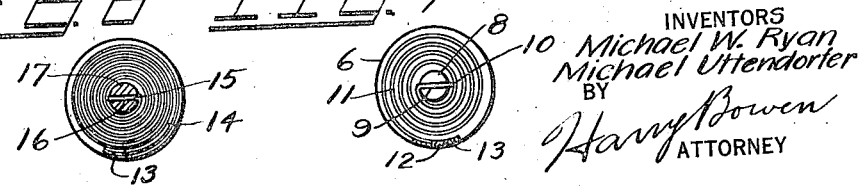
INVENTORS
Michael W. Ryan
Michael Uttendorfer
BY
Harry Bowen
ATTORNEY Patented Oct. 2, 1923.

1,469,444

UNITED STATES PATENT OFFICE.

MICHAEL W. RYAN AND MICHAEL UTTENDORFER, OF SEATTLE, WASHINGTON.

RADIATOR METER.

Application filed November 19, 1921. Serial No. 516,339.

*To all whom it may concern:*

Be it known that we, MICHAEL W. RYAN and MICHAEL UTTENDORFER, citizens of the United States, residing at Seattle, county of King, and State of Washington, have invented a new and useful Radiator Meter; and we do hereby declare that the following is a full, clear, and exact specification, such as will enable others skilled in the art to which it appertains to make and use the same.

The invention is a device to be screwed into the top of an automobile radiator for indicating the temperature of the water in the radiator.

The object of the invention is to provide a device for indicating the temperature of the water in the radiator of an automobile.

Another object of the invention is to provide a device for indicating the temperature of the water in an automobile radiator by shutting off the amount of white light that may pass through an opening in the device with a red film.

Another object of the invention is to provide a device that will display a red light when the temperature of the water in an automobile radiator rises and that will display a green light when the temperature of the water falls.

And a still further object of the invention is to provide a thermostatic element in the shape of a watch spring with a stem projecting from its center so that as the temperature rises the spring being made of thermostatic metal will expand and open up and turn the rod projecting from its center.

With these ends in view, the invention embodies a coil spring similar to a watch spring which may be made in two sections installed in a suitable casing so that it may be screwed into the cap of an automobile radiator. The spring has a rod projecting from its center which is held in bearings in the casing and this has a cylindrical shaped member on its upper end which is constructed of a transparent material with inverted V shaped slots through it. This member is surrounded by a glass tube and this is held in a casing with holes in each side which is screwed on top of the casing which houses the thermostatic spring.

Other features and advantages of the invention will appear from the following description taken in connection with the drawings, wherein—

Figure 1 is an elevation of the device showing the device with an auxiliary cap of an elaborate design attached to it.

Figure 2 is an elevation of the device.

Figure 3 is a cross section on line 3—3 of Figure 2.

Figure 4 is a side elevation showing the light area almost closed as it would appear when the temperature of the water is above normal.

Figure 5 is a detail of the thermostatic element and the transparent member.

Figure 6 is a section on line 6—6 of Figure 5.

Figure 7 is a section on line 7—7 of Figure 5.

In the drawings I have shown my radiator meter as it would appear in use in Figure 1 and as it would appear detached in Figure 2 wherein numeral 1 indicates the main casing in the sides of which are the openings 2 and which is screwed on to the base 3 with the threads 4. The base 3 is constructed as shown in Figure 3 with a cylindrical hole 5 in its center in the lower end of which is a plug 6 which fits in the grove 7 and after the device is assembled it is welded into place. On top of the plug 6 is a stem 8 in which is a slot 9 which holds the end 10 of the spring 11. The outer end of the spring 11 bent outward to form a flange 12 over which the prongs 13 on the lower side of the spring 14 project. The spring 14 sets on top of the spring 11 and its inner end is bent to form a straight flange 15 which fits into the slot 16 in the end of the rod 17.

On the upper end of the rod 17 is a disc 18 in which is the recess 19 and in this a thin transparent cylinder 20 is held by the ring 21, while the upper end of the cylinder is held in a recess 22 of a disc 23 in the center of which is a round hole 24, by the ring 25. The transparent cylinder 20 has a triangular shaped opening 26 through both sides of it and the edges forming the sides of the triangle may be curved as shown in Figure 5. These edges may also be protected by a thin metal bead 27. A glass tube may be placed around the cylinder inside of the casing.

The remaining sections of the transparent cylinder between the triangular shaped openings 26 may be divided in half as shown in Figure 3 by the use of red material on one side and green material on the other side, so that as the temperature of the water rises the red material will show and as the temperature falls, which would cause the element to rotate in the opposite direction the green material would show.

On the lower portion of the base 3 may be a smooth section 28 to house the springs with a threaded portion 29 above it by which the device may be screwed into the top of a radiator cap and on this portion may be a nut 30 for locking it on the cap.

Casing lugs 31 may be placed on the sides of the boss at the lower end of the cap 1 over which an auxiliary cap 32 which may have an elaborate design on it as shown in Figure 1 may be held.

It will be understood that changes may be made in the construction without departing from the spirit of the invention, one of which changes may be in the making of the thermostatic spring in one piece instead of two sections as shown or it may be made in more than two sections, another may be in the design of the upper casing 1 or in the shape of the holes in it and still another may be in the construction of the transparent cylinder 20 or this may be made by connecting a glass tube to the top of the rod and painting the colors on it to conform to the design of the inner element, which would then be eliminated.

The construction will be readily understood from the foregoing description. To use the device it may be screwed into the top of an automobile radiator cap and set as shown in Figure 1 or Figure 2 with a strip of red showing on the left hand side of the opening 2 and a strip of green showing on the right hand side of the opening, then as the temperature of the water in the radiator rises, the springs 11 and 14 will expand and turn the transparent cylinder 20 through the rod 17 to the position shown in Figure 4 in which the strip of green has disappeared and the strip of red coming from the left on the near side of the device almost closes the opening and at the same time a strip of red on the far side of the opening also moves into the position shown in Figure 4. As the temperature continues to rise the element will continue to turn until all of the while light has been shut off thus displaying only red. Should the temperature of the water fall instead of rise, the device would turn in the opposite direction and a strip of green would cover the opening in the same manner.

Having thus fully described the invention what we claim as new and desire to secure by Letters Patent is—

A temperature indicator having a cylinder directly attached to a thermostatic element; said cylinder being made of celluloid and in two halves with an open space between them, each of said halves having a red and green section, said cylinder having a metal band at each end and a disc at the lower end with a stem projecting from it by which it is attached to the thermostatic element; said thermostatic element being in the form of a coil spring; and said cylinder and thermostatic element being mounted in a suitable casing which has bearings for the stem of the cylinder and to which the free end of the thermostatic element is attached, and said casing having a glass tube which surrounds the cylinder, and openings through it through which the cylinder may be seen.

MICHAEL W. RYAN.
MICHAEL UTTENDORFER.